(12) United States Patent
Kasamatsu

(10) Patent No.: US 7,656,560 B2
(45) Date of Patent: Feb. 2, 2010

(54) FACSIMILE MACHINE

(75) Inventor: Daisuke Kasamatsu, Chita-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 695 days.

(21) Appl. No.: 11/094,138

(22) Filed: Mar. 31, 2005

(65) Prior Publication Data

US 2005/0219638 A1    Oct. 6, 2005

(30) Foreign Application Priority Data

Mar. 31, 2004    (JP)    ............... P2004-105573

(51) Int. Cl.
*H04N 1/00*    (2006.01)
(52) U.S. Cl. .............. 358/400; 358/1.15; 358/437; 358/500; 358/501; 379/100.01; 379/100.09; 709/204
(58) Field of Classification Search ........ 358/400, 358/402, 444, 1.15, 501, 401, 426.09, 436, 358/437, 440, 468, 1.16, 406; 379/100.01–100.09, 379/88.03, 93.08, 110.01; 709/204
See application file for complete search history.

(56) References Cited

U.S. PATENT DOCUMENTS

| | | | | | |
|---|---|---|---|---|---|
| 4,975,783 | A | * | 12/1990 | Takaoka | 358/404 |
| 5,668,640 | A | * | 9/1997 | Nozawa et al. | 358/434 |
| 5,838,459 | A | * | 11/1998 | Hashimoto | 358/402 |
| 5,905,582 | A | * | 5/1999 | Hirai et al. | 358/468 |
| 6,185,379 | B1 | | 2/2001 | Lay et al. | |
| 6,222,539 | B1 | | 4/2001 | Watts | |
| 6,226,096 | B1 | * | 5/2001 | Ouchi | 358/1.14 |
| 6,775,035 | B1 | * | 8/2004 | Yoshida | 358/539 |
| 6,876,819 | B2 | * | 4/2005 | Sawada et al. | 399/9 |
| 7,019,855 | B1 | * | 3/2006 | Lee | 358/1.15 |
| 7,061,653 | B2 | * | 6/2006 | Kohri | 358/400 |
| 7,102,776 | B2 | | 9/2006 | Yamamoto | |
| 7,295,337 | B2 | * | 11/2007 | Eguchi et al. | 358/1.15 |
| 2001/0024301 | A1 | * | 9/2001 | Kohri | 358/500 |
| 2002/0091971 | A1 | * | 7/2002 | Sawada et al. | 714/46 |

(Continued)

FOREIGN PATENT DOCUMENTS

JP    5328080    12/1993

(Continued)

OTHER PUBLICATIONS

Notification of First Office Action dated Dec. 22, 2006 in Chinese Application No. 2005-10056204.8.

(Continued)

*Primary Examiner*—Houshang Safaipour
*Assistant Examiner*—Negussie Worku
(74) *Attorney, Agent, or Firm*—Banner & Witcoff, Ltd

(57) ABSTRACT

A facsimile machine includes: a display that displays a menu screen including a menu item, an operation unit that allows a user an entry based on the menu screen, and a display control unit that changes the menu screen to be displayed on the display in response to the entry. The display control unit controls display/undisplay of the menu item based on a predetermined operational status of the facsimile machine when the display control unit changes the menu screen. The menu item corresponds to an operation effective to the predetermined operational status.

10 Claims, 7 Drawing Sheets

U.S. PATENT DOCUMENTS

2003/0020760 A1* 1/2003 Takatsu et al. .............. 345/810
2004/0030684 A1   2/2004 Nakata et al.

FOREIGN PATENT DOCUMENTS

| JP | 2000-069212 A  | 3/2000 |
| JP | 2001069292 A2  | 3/2001 |
| JP | 2002101257 A   | 4/2002 |
| JP | 2004-13210 A   | 1/2004 |
| JP | 2004040413 A2  | 2/2004 |

OTHER PUBLICATIONS

Notice for Reasons for Rejection dated May 15, 2007 in Japanese Application No. 2004-105573 and English translation thereof.
Notification of the Second Office Action for Chinese Application # 200510056204.8, Mail Date Jul. 11, 2008.
Notification for Reasons for rejection mailed Aug. 7, 2007 in Application No. JP2004-105573 and English translation thereof.

* cited by examiner

FACSIMILE MACHINE

BACKGROUND OF THE INVENTION

1. Field of the Invention

This invention relates to a facsimile machine for displaying a menu screen concerning operation modes to be operated by the user and more particularly to a facsimile machine capable of displaying on a menu screen an operation mode required for a predetermined type of machine status or error occurs only when such machine status or error is occurring.

2. Background Art

Hitherto, the user has set various operation modes by performing predetermined key entry through input keys provided on an operation panel of a facsimile machine or selecting a necessary menu item out of a menu screen displayed on a display provided on the operation panel.

On the other hand, menus for maintenance operation required if the facsimile machine fails and some functions are made unavailable, such as a menu for readjusting the original read function because it becomes impossible to normally read a facsimile original and a menu required because the print function fails, generally are excluded from the user-selectable menus because the menus are not daily necessary menus and are hard to handle by the user.

Thus, if the facsimile machine fails, the user must always request the manufacturer to repair the facsimile machine and the serviceperson dispatched from the manufacturer calls a maintenance menu by operating the facsimile machine according to a special procedure known only by the serviceman for repair.

By way of example, the case where the print function fails will be discussed. When the facsimile machine fails, if the power is turned off, the data is lost even if the data received by the facsimile is not yet printed out.

Usually, if a paper-out condition or a print function failure occurs and a record error occurs, a substitute reception is applied. The received data can be stored in memory as "substitute reception data" and the "substitute reception data" can be printed out after the machine is recovered from the record error.

However, if it is hard to recover the machine from the record error, there is no help for it and the power needs to be once turned off. At this time, the data in the memory containing the "substitute reception data" is lost.

To overcome the problem, the serviceperson uses numeric keys and a DIP switch to perform predetermined operation, thereby transferring the "substitute reception data" to another facsimile machine (FAX transfer) and then the power is turned off for repair. (For example, refer to JP-A-5-328080)

SUMMARY OF THE INVENTION

However, the user cannot know the contents of the "substitute reception data" until the serviceperson arrives and performs FAX transfer processing; this is a problem. Even if the machine is recovered from the error simply by turning off and on the power of the machine, the user cannot attempt to turn off and on the power and thus there is no help for it and the user must wait for the serviceperson to arrive; this is a problem.

To solve the problem, it is also considered that a menu for fetching the substitute reception data (FAX transfer menu) is added to the user-selectable menus. However, the menu is a menu required only at the failure time and is not possibly used in normal situations, and therefore adding the menu is undesirable in ease of use considering the fact that a large number of usual menus are already set.

That is, if an unnecessary menu is always displayed regardless of whether or not the machine is in a failure state, it is feared that the user may make an erroneous selection and it will take time in selection.

Particularly, some recent facsimile machines are configured each as a multifunction processing machine connected to a personal computer, etc., so that it is provided with a printer function, a scanner function, and a copy function, etc., as well as the facsimile function. With such a multifunction processing machine, a menu system having a hierarchical structure of menu screens is used to select a menu item for setting any of various operation modes while a transition is made from one menu screen to another. The number of menu items displayed on the menu screen increases with high function and complication of the facsimile machine, and the levels of the menu screens become deep. Thus, to set one operation mode, it is difficult for the user to find out the necessary menu item and it takes time and labor in setting the operation mode; this is a problem.

It is therefore an object of the invention to provide a facsimile machine capable of displaying on a menu screen an operation mode required for a predetermined type of machine status or error only when such machine status or error is occurring, thereby simplifying the menu screen composition and enabling the user to set or specify various operation modes easily and promptly.

To achieve the object, the invention provides a facsimile machine, including: a display that displays a menu screen including a menu item; an operation unit that allows a user an entry based on the menu screen; and a display control unit that changes the menu screen to be displayed on the display in response to the entry. The display control unit controls display/undisplay of the menu item based on a predetermined operational status of the facsimile machine when the display control unit changes the menu screen. The menu item corresponds to an operation effective to the predetermined operational status.

Preferably, the predetermined operational status corresponds to an occurrence of a predetermined machine error. The menu item corresponds to an operation that is effective to the predetermined machine error. The display control unit allows the menu item to be displayed on the menu screen only when the predetermined machine error is occurring.

Preferably, the facsimile machine further includes: a communication control unit being connected to a line for transmitting and receiving image data, a storage unit that stores the image data received by the communication control unit; and a record unit that records the image data stored in the storage unit on record paper. The machine error corresponds to a record error disabling execution of record by the record unit.

Preferably, when the record error occurs, the display control unit selectably displays on the menu screen the menu item relating to a facsimile transfer operation for transmitting the image data that is stored in the storage unit to a different terminal by the communication control unit.

Preferably, the facsimile machine further includes: a transmitter information storage unit that stores transmitter information to identify a transmitter. The facsimile transfer operation corresponds to an operation for transmitting the image data with the transmitter information to the different terminal when the transmitter information is stored in the transmitter information storage unit.

Preferably, the facsimile machine further includes: a storage unit that stores layers of menu including a plurality of menu items and information indicating a correspondence between the predetermined machine error and any of the menu items effective to the predetermined machine error; and a determination unit that determines whether the predetermined machine error occurs. The display control unit allows the menu item, which is included in the plurality of menu items and effective to the predetermined machine error, to be displayed on the menu screen only when the determination unit determines that the predetermined error occurs, the menu screen corresponding to one of the layers of menu that includes the menu item effective to the predetermined machine error.

Preferably, the facsimile machine further includes: the menu item effective to the predetermined machine error includes at least one of a menu item relating to an operation to overcome the predetermined machine error, and a menu item providing a function as a substitute for a function that is incapable due to the predetermined machine error.

Preferably, the operation unit includes numeric keypads; and the display control unit allows the menu item effective to the predetermined machine error to be displayed on the menu screen in response to an entry of a numeral designating the menu item through the numeric keypads, only when the predetermined machine error is occurring.

Preferably, the operation unit includes a cursor key; and the display control unit changes the menu screen to be displayed in response to a press of the cursor key such that the menu item effective to the predetermined machine error is displayed, only when the predetermined machine error is occurring.

According to one aspect of the invention, the menu item effective to the predetermined operational status is determined to be displayed/undisplayed based on the predetermined operational status while changing the menu screen in response to the user's entry at the operation unit. Then, the user can effectively cope with the predetermined operational status by selecting and operating the menu item. Accordingly, the user can easily and quickly find the menu item corresponding to the effective operation when the machine is in the predetermined operational status, while simplifying the menu items in the menu screen when the machine is in a normal condition.

Further, only if a machine error occurs in the facsimile machine, it is made possible to display the operation mode capable of handling the machine error on the screen, so that it is made possible to display on a menu screen the operation mode required for a predetermined type of machine error only when such machine error is occurring, thereby simplifying the menu screen composition and enabling the user to set or specify various operation modes easily and promptly.

Further, the machine error is a record error disabling execution of record of the record unit. Thus, when a record error is occurring, the user can reliably select the operation mode capable of handling the record error and can handle the record error. When a record error is not occurring, the operation mode capable of handling the record error is not displayed, so that the menu screen composition can be simplified for enabling the user to set or specify various operation modes easily and promptly.

Further, when a record error is occurring, it is made possible to selectably display the facsimile transfer operation menu for transmitting the received image data to a different terminal, so that the user can reliably select the facsimile transfer operation and can handle the record error.

Further, if transmitter information is previously registered, the image data with the transmitter information is transmitted to a different terminal by performing the facsimile transfer operation, so that the receiving party can be prevented from having the trouble determining how the received data is to be handled because the transmitter cannot be identified.

BRIEF DESCRIPTION OF THE DRAWINGS

The present invention may be more readily described with reference to the accompanying drawings, in which.

DETAILED DESCRIPTION OF THE PREFERRED EMBODIMENTS

Referring now to the accompanying drawings, there is shown a preferred embodiment of a multifunction processing machine 1 implementing a facsimile machine according to the invention. The facsimile machine illustrated as the embodiment is built in the multifunction processing machine 1 including image scanner, printer, copier, and facsimile functions in one machine.

Figure 1:
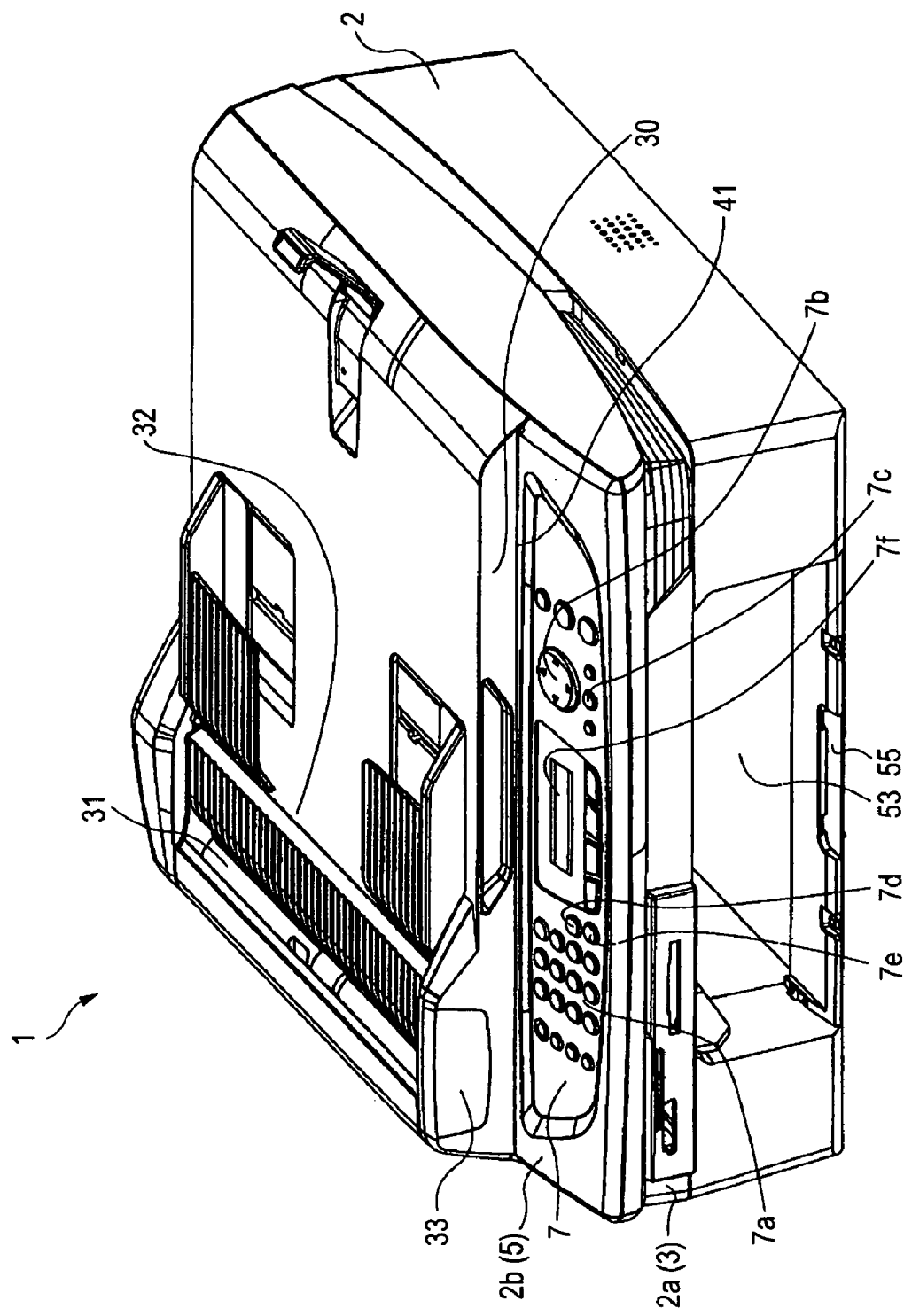
FIG. 1 is an external perspective view of a multifunction processing machine.
Figure 2:
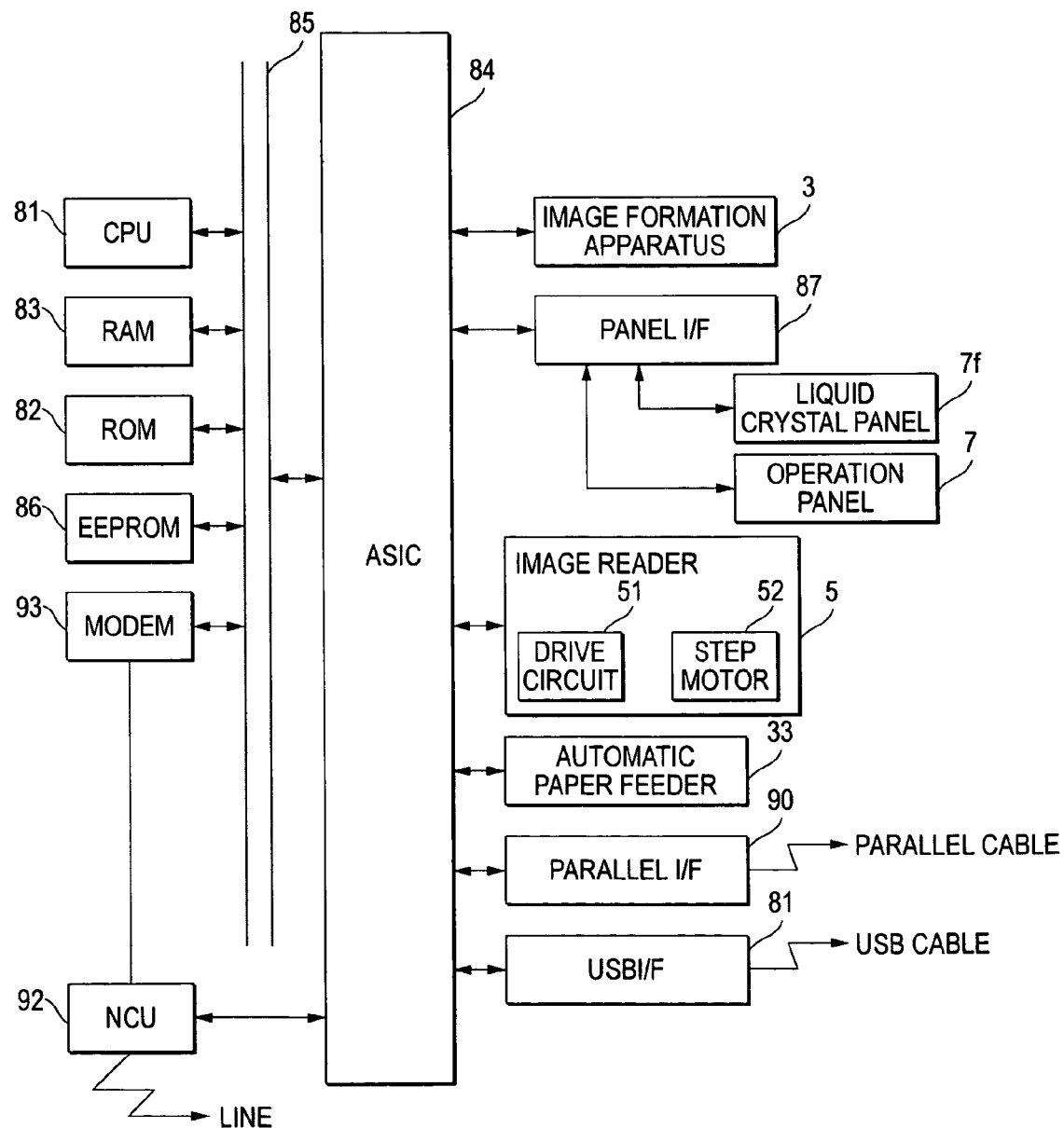
FIG. 2 is a block diagram to show the electric configuration of a controller.
Figure 3:
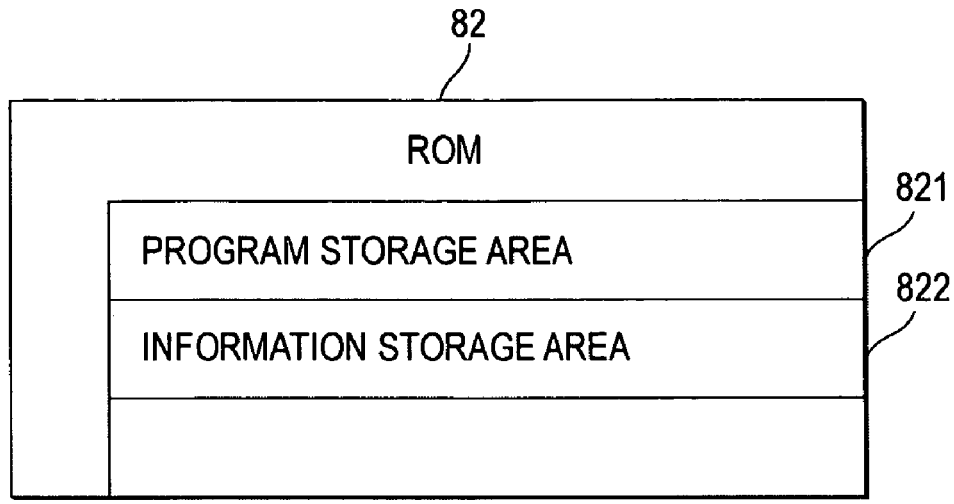
FIG. 3 is a conceptual drawing to show the composition of storage areas of ROM.
Figure 4:
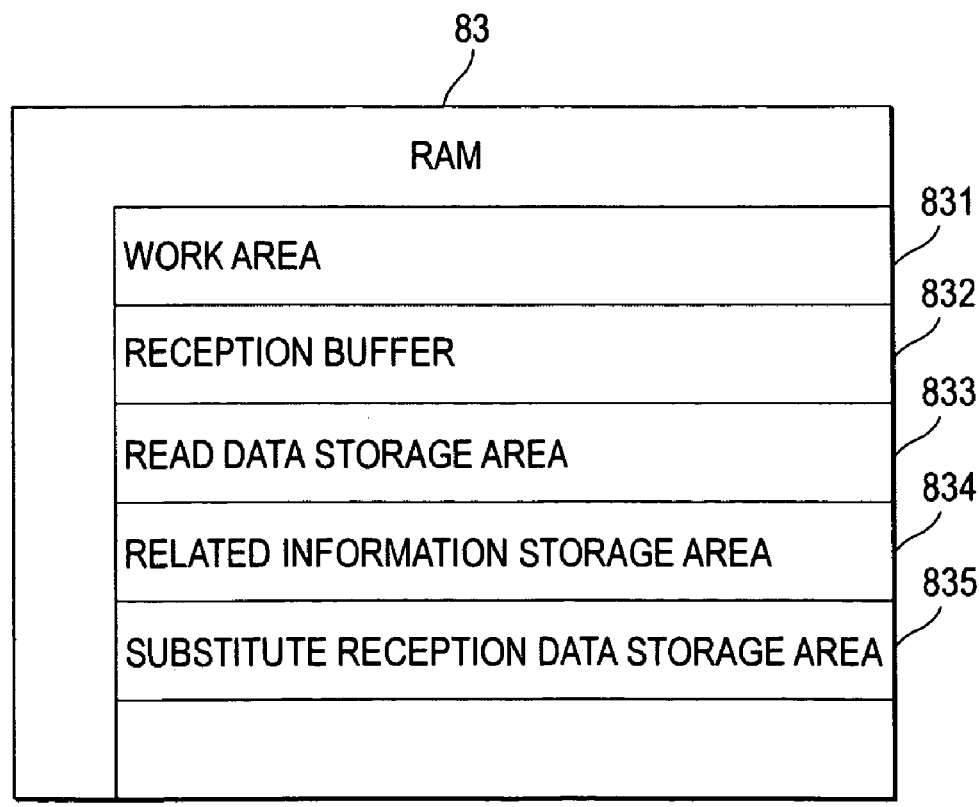
FIG. 4 is a conceptual drawing to show the composition of storage areas of RAM.
Figure 9:
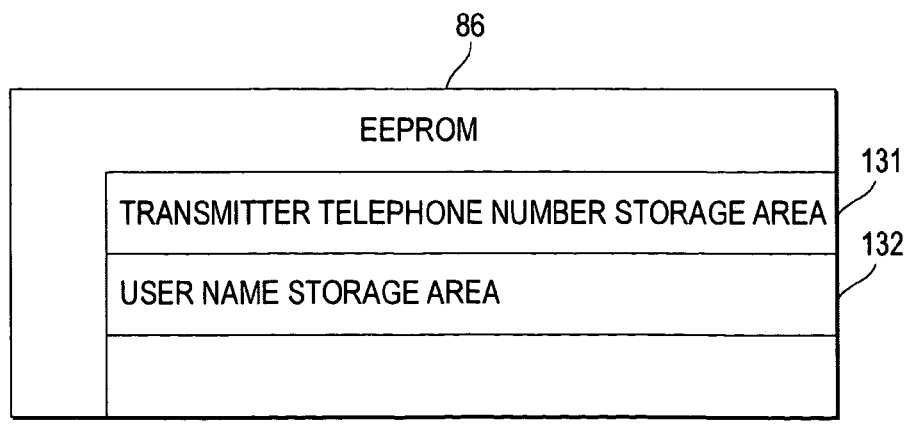
FIG. 9 is a conceptual drawing to show the composition of storage areas of EEPROM.

To begin with, an outline of the configuration of the multifunction processing machine 1 of the embodiment will be discussed with reference to the accompanying drawings. FIG. 1 is an external perspective view of the multifunction processing machine 1, FIG. 2 is a block diagram to show the electric configuration of a controller 80, FIG. 3 is a conceptual drawing to show the composition of storage areas of ROM 82, FIG. 4 is a conceptual drawing to show the composition of storage areas of RAM 83, and FIG. 9 is a conceptual drawing to show the composition of storage areas of EEPROM 86.

As shown in FIG. 1, the multifunction processing machine 1 includes a clamshell type opening/closing structure with an upper main body 2b attached to a lower main body 2a in an openable/closable manner in a main body 2, and an image formation apparatus 3 (in the embodiment, ink jet printer) is built in the lower main body 2a and an image reader 5 is built in the upper main body 2b. An operation panel 7 for the user to set or specify various operation modes of the facsimile function, the scanner function, and the copy function is placed on the front of the upper main body 2b. The operation modes are various conditions covering the operations to be executed and the operation environments concerning the above functions.

The image reader 5 built in the upper main body 2b of the multifunction processing machine 1 includes both a flatbed mechanism (FB) for reading an image from an original placed on a platen glass 41 and an automatic paper feeder or automatic document feeder (ADF) for moving an original between an original ejection port 31 and an original insertion port 32 and reading an image. That is, the platen glass 41 is a rectangular glass plate provided horizontally in the upper main body 2b and an original is placed on the platen glass 41 and a read head (not shown) below the platen glass 41 scans the original, whereby an image is read from the original. The original insertion port 32 and the original ejection port 31 are provided in the upper main body 2b and an original inserted into the original insertion port 32 is transported by an automatic paper feeder 33 via the read position of the read head (not shown) to the original ejection port 31, whereby an image is read from the original. The image reader 5 also includes a clamshell type opening/closing structure in which a cover section 30 covering the top face of the platen glass 41 is attached in an openable/closable manner.

The image formation apparatus 3 built in the lower main body 2a of the multifunction processing machine 1 receives a sheet-like record medium (in the embodiment, record paper) from a paper feed tray (not shown) at the rear of the multifunction processing machine 1 and forms an image on the record side of the record paper (in the embodiment, prints according to an ink jet technique). The record paper with the image recorded thereon is ejected from a paper ejection port 53 on the front of the multifunction processing machine 1. A drawer type paper ejection tray 55 is stored below the paper ejection port 53 and can be drawn out as required for receiving record paper ejected from the paper ejection port 53.

The operation panel 7 is provided with buttons and switches for the user to make various entries and settings, such as numeric keys 7a for entering a numeric value, cursor keys 7b for selecting a direction out of four cross directions, a Menu/Set button 7c for displaying an initial menu screen displayed in the default state and determining the operation mode, etc., a Black Fax Start button 7d for executing FAX transmission/reception in a monochrome mode, and a Color Fax Start button 7e for executing FAX transmission/reception in a color mode, a liquid crystal panel 7f for displaying menu screens with menu items, entries of the user, error indications, etc., and the like. The user can use the buttons and the switches to specify the operation modes, etc., and can also set the operation modes and display another menu screen by selecting any menu item out of the menu screen displayed on the liquid crystal panel 7f.

As shown in FIG. 2, the controller 80 included in the multifunction processing machine 1 is control means for controlling the operation of the multifunction processing machine 1. The controller 80 is configured centering on a microcomputer as a control section including a CPU 81, ROM 82, and RAM 83 and includes an ASIC 84 (Application-Specific Integrated Circuit). The controller 80 controls the whole operation executed in the multifunction processing machine 1 as well as the operation executed in the image reader 5 and the image formation apparatus 3 described above, needless to say.

The controller 80 is made up of the CPU 81 for executing various operations and control, the ROM 82 storing programs such as BIOS and the like required for the control of the CPU 81, the RAM 83 having storage areas for temporarily storing data, an EEPROM 86 as a rewritable nonvolatile memory for storing the setup values of the multifunction processing machine 1, various flags for operation control, and transmitter information described later, and the ASIC 84, these components being connected via a bus 85.

Connected to the ASIC 84 are the image formation apparatus 3, a panel interface 87 with the operation panel 7 and the liquid crystal panel 7f, a drive circuit 51 for a step motor 52 to move the read head (not shown) of the image reader 5, the automatic paper feeder 33, a parallel interface 90 for inputting/outputting image information from/to an external personal computer (PC) (not shown), etc., a USB interface 91 for inputting/outputting image information from/to an external apparatus such as a digital camera, and a network control unit (NCU) 92 and a modem 93 for transferring information to and from a facsimile machine of an external terminal over a public switched network. An external PC may be connected to the USB interface 91.

As shown in FIG. 3, the ROM 82 of the multifunction processing machine 1 is provided with a program storage area 821 storing a control program, etc., for controlling the operation of the multifunction processing machine 1 and a menu screen display program for controlling menu screen display and an information storage area 822 storing information of settings, initial values, data, a lookup table, etc., (not shown) required for program execution. Further, the ROM 82 is provided with various storage areas (not shown).

As shown in FIG. 4, the RAM 83 of the multifunction processing machine 1 is provided with storage areas such as a work area 831 for storing temporary data during program execution, a reception buffer 832 for storing FAX reception data of image data received from another terminal by the facsimile function, a read data storage area 833 for storing image data read from the image reader 5, a related information storage area 834 for storing various pieces of data of the original size (length in read direction), the image area length, the image read mode, etc., and a substitute reception data storage area 835 for storing substitute reception data. Further, the RAM 83 is provided with various storage areas (not shown).

In the configuration, when FAX data is received from a different facsimile machine, the FAX data is temporarily stored in the reception buffer 832 and then is printed on record paper by the image formation apparatus 3. If the print operation is normally executed, the FAX reception data temporarily stored in the reception buffer 832 is erased.

If record paper runs out or the image formation apparatus 3 fails during the printing and printing is disabled, namely; if a record error occurs, a substitute reception mode is entered and the FAX reception data received from the different facsimile machine is stored in the substitute reception data storage area 835 of the RAM 83.

Then, if the machine is replenished with new record paper and is recovered to a printable state, the FAX reception data stored in the substitute reception data storage area 835 is read and is printed on record paper by the image formation apparatus 3. When the print operation is normally executed, the FAX reception data stored in the substitute reception data storage area 835 is erased.

However, if it becomes impossible to print due to a failure of the image formation apparatus 3, the record error state cannot be eliminated unless the failure cause is located and the machine is repaired. The user might want to attempt to once turn off and again turn on the power of the machine because the machine may be often recovered to the normal state in doing so. However, if the power is once turned off with the FAX reception data stored in the substitute reception data storage area 835, the electric power supplied to the RAM 83 is also cut and therefore the FAX reception data as the substitute reception data is also lost at the same time. Therefore, if the machine is normally recovered from the failure, the data cannot be printed on record paper. If the FAX transmitting party is known, it is also possible to request the transmitting party to again transmit the data; however, if the transmitting party can not be identified, there is no help for it.

Then, in the facsimile machine according to the embodiment of the invention, even when such a record error occurs and it is difficult to recover the machine unless the power is once turned off, the FAX reception data stored in the substitute reception data storage area 835 can be transmitted to a different facsimile machine (FAX transfer) and moreover the user can execute FAX transfer to any desired facsimile machine without the need for calling the serviceperson.

Figure 5:
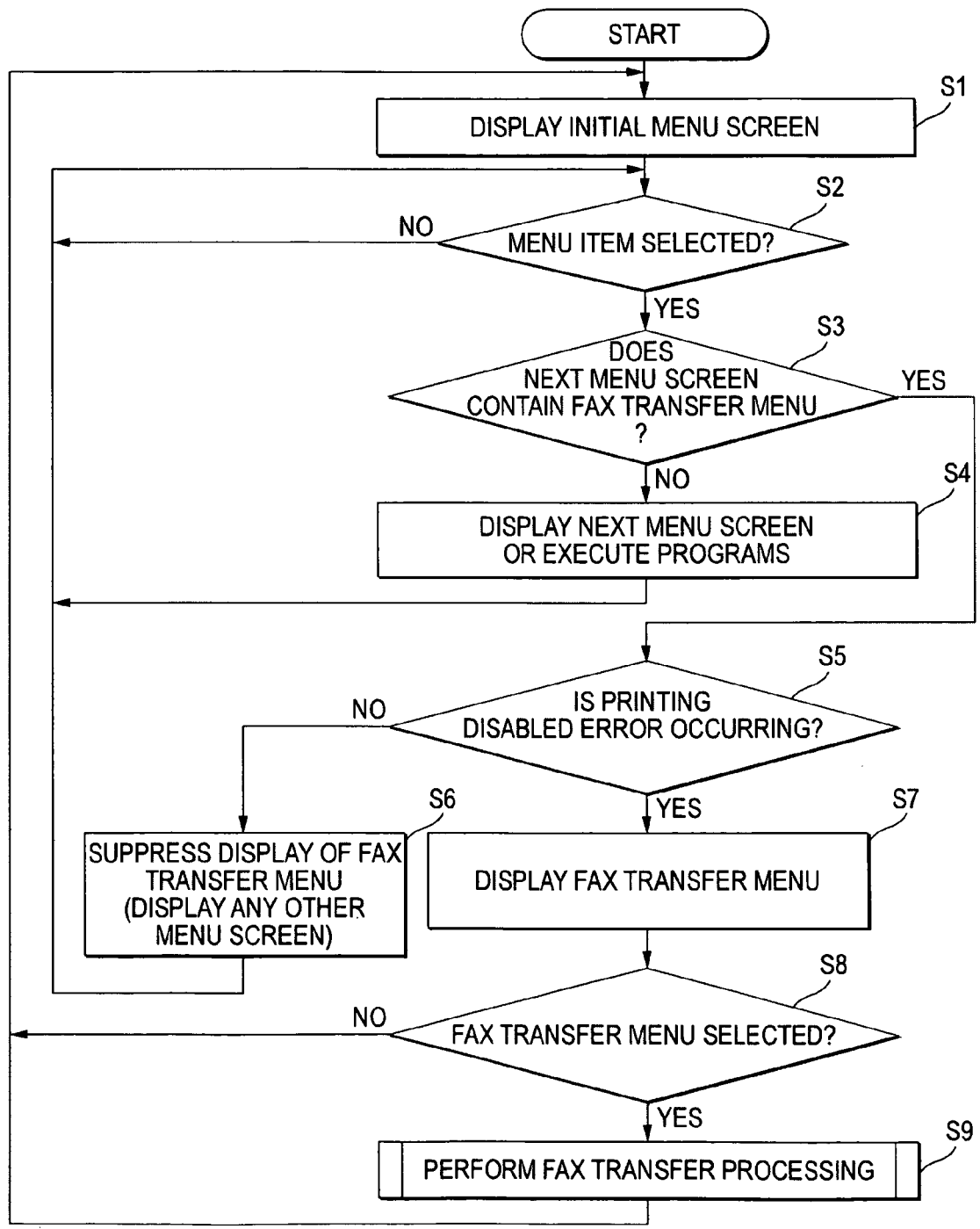
FIG. 5 is a main flowchart of menu screen display processing.
Figure 6:
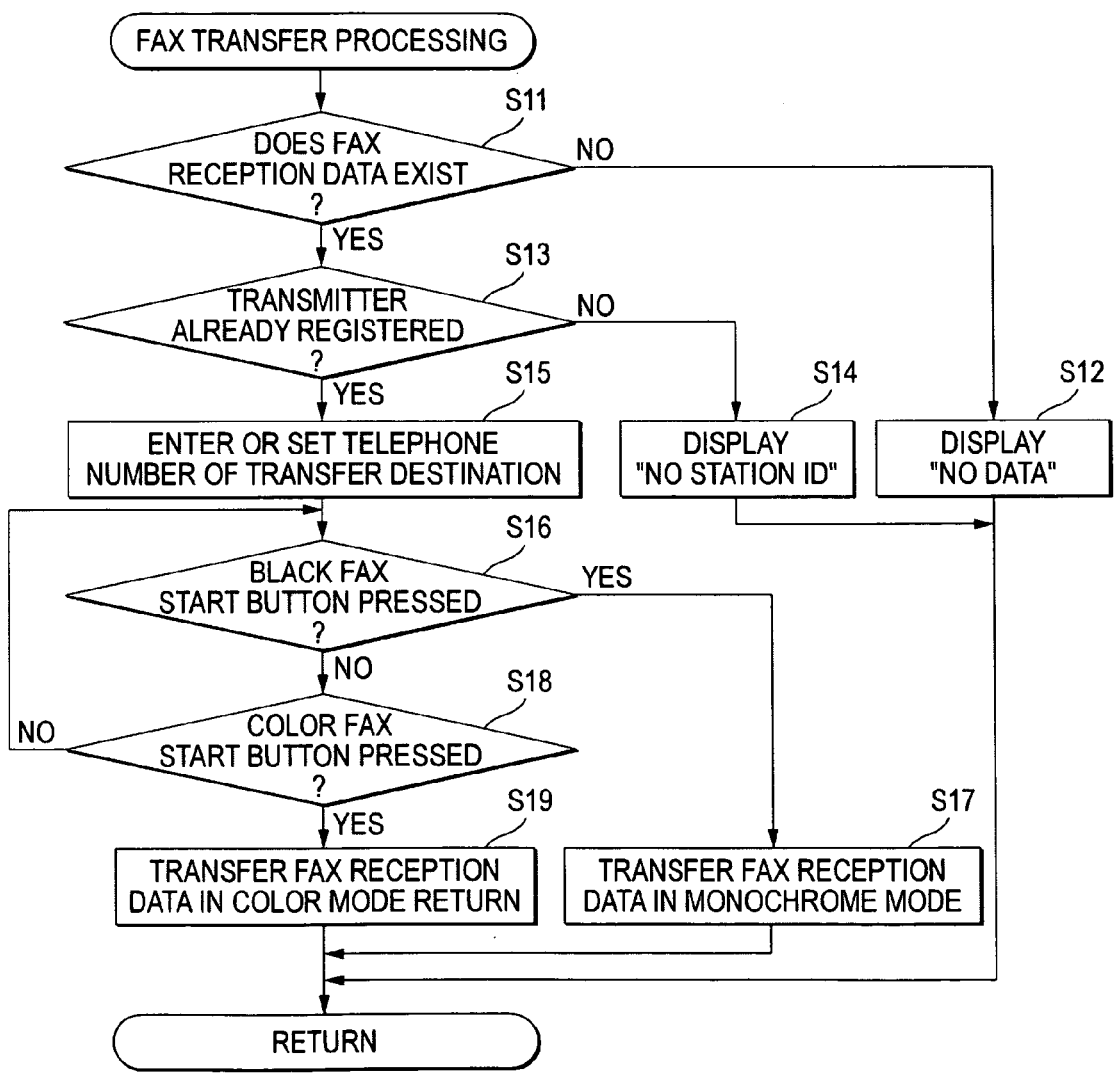
FIG. 6 is a flowchart to show the details of FAX transfer processing.
Figure 7:
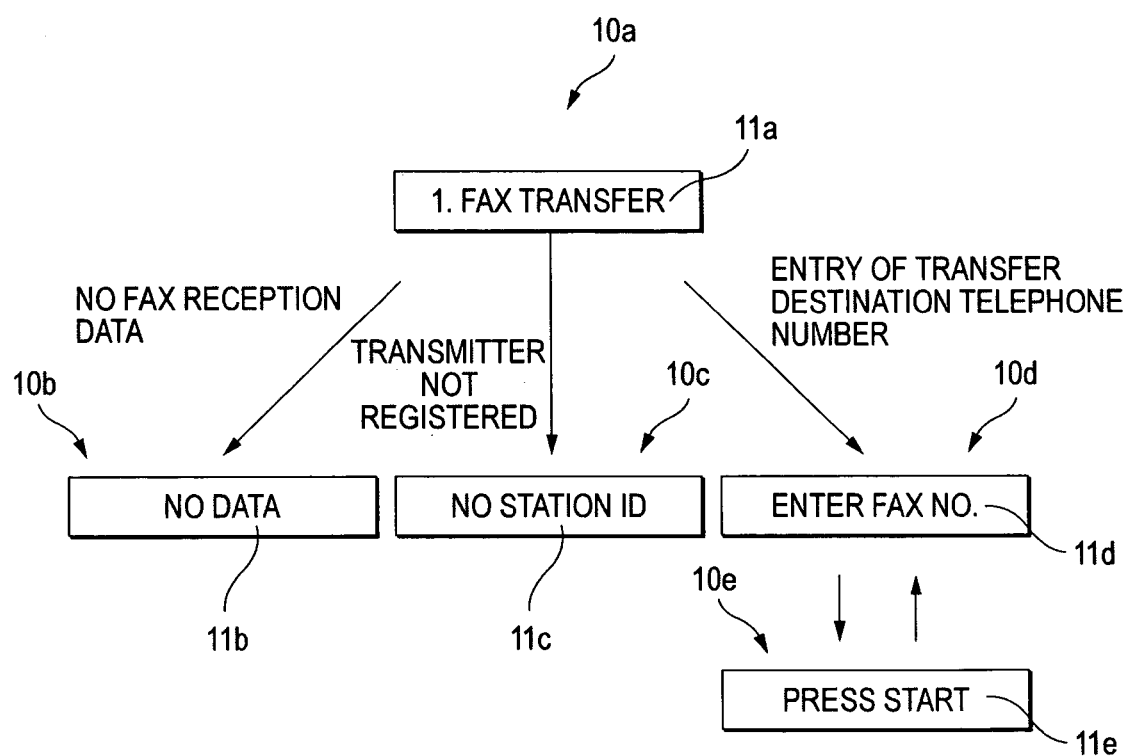
FIG. 7 is a drawing to show a specific example of a menu screen (one-line type) display mode.
Figure 8:
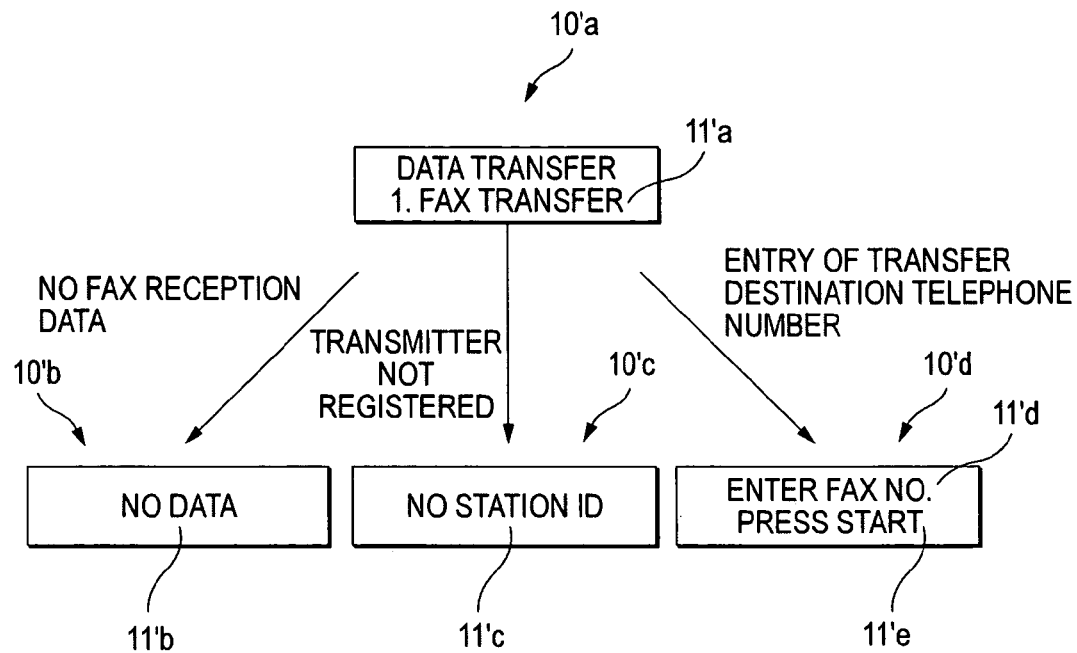
FIG. 8 is a drawing to show a specific example of a menu screen (two-line type) display mode.

A FAX transfer procedure will be described in detail with reference to FIGS. 5 to 9. FIG. 5 is a main flowchart of menu screen display processing. FIG. 6 is a flowchart to show the details of FAX transfer processing (S9). FIG. 7 is a drawing to show a specific example of a menu screen (one-line type) display mode. FIG. 8 is a drawing to show a specific example of a menu screen (two-line type) display mode.

The menu screen display processing shown in the main flowchart of FIG. 5 is started when the user presses the Menu/Set button 7*c*. Described below is an example of the menu screen display processing executed in the multifunction processing machine 1 if the user sets or specifies a FAX transfer menu for transmitting image data received from a different terminal to a different facsimile machine when the print function fails (or record paper runs out) as the operation mode of the multifunction processing machine 1. In the embodiment, to select the FAX transfer menu, the user presses the numeric keys 7*a* in the order of "9"→"0"→"1" after pressing the Menu/Set button 7*c*.

As shown in FIG. 5, in the menu screen display processing, an initial menu screen displayed in the default state is displayed on the liquid crystal panel 7*f* (S1). With the initial menu screen as the base, for example, the user presses the up, down, left, or right cursor key 7*b* provided on the operation panel 7 for selecting a menu item contained in the menu screen, thereby making a transition of the menu screen. The menu items are options for specifying a different menu screen or a predetermined operation mode and also include items not displayed (for example, even when only a part of the menu item is displayed on the menu screen, and if the user presses the up, down, left, or right cursor key 7*b*, a transition is made to a different menu screen containing another part of the menu items corresponding to the pressed direction). If the user selects the menu item corresponding to any desired operation mode, various programs for causing the operation mode to function are executed by the CPU 81. The user can also directly specify a predetermined operation mode by entering a predetermined numeric value using the numeric keys 7*a*. In the embodiment, if the user directly specifies the operation mode by entering a numeric value using the numeric keys 7*a*, a transition is also made to the menu screen in response to the entry.

When the user selects a menu item on the displayed menu screen (YES at S2), and if the next menu screen corresponding to the selected menu item does not contain the FAX transfer menu as a menu item (NO at S3), the next menu screen is displayed or if the menu item selected at S2 is a menu item specifying a predetermined operation mode, the program for causing the operation mode to function is executed. Then, the process returns to S2. If the user does not select a menu item (NO at S2), a wait state is entered at S2.

On the other hand, if the next menu screen contains the FAX transfer menu (YES at S3), whether or not a printing disabled error is occurring in the multifunction processing machine 1 is determined (S5). The printing disabled error refers to a state in which printing on record paper cannot be executed due to an ink-out condition, a record paper-out condition, or a failure of the image formation apparatus 3. Whether or not a printing disabled error is occurring may be determined according to any known technique as in the embodiment, based on various sensors for monitoring and determining a printing disabled error and a control program.

If a printing disabled error is not occurring (NO at S5), the FAX transfer menu is not displayed (S6). For example, the FAX transfer menu is excluded from the next menu screen to be displayed on the liquid crystal panel 7*f*. Alternatively, any other menu screen not containing the FAX transfer menu may be displayed. Then, the process returns to S2.

If a printing disabled error is occurring (YES at S5), the FAX transfer menu is displayed (S7). That is, the next menu screen containing the FAX transfer menu is displayed on the liquid crystal panel 7*f*. If the user selects the FAX transfer menu on the menu screen (YES at S8), FAX transfer processing described later is executed (S9) and the process returns to S1. If the user does not select the FAX transfer menu (NO at S8), it is assumed that selection of the FAX transfer menu is aborted, and the process returns to S1.

At S7, if the liquid crystal panel 7*f* is a display (one-line type) capable of displaying one-line information, a menu screen 10*a* containing a menu item 11*a* "1. FAX Transfer" indicating the FAX transfer menu is displayed as shown in FIG. 7. If the liquid crystal panel 7*f* is a display (two-line type) capable of displaying two-line information, a menu item "Data Transfer" of upper level is displayed together on a menu screen 10'*a* containing a menu item 11'*a* "1. FAX Transfer" indicating the FAX transfer menu as shown in FIG. 8.

In the embodiment, if the user presses the numeric keys 7*a* in the order of "9"→"0"→"1" after pressing the Menu/Set button 7*c* and S1 to S4 are repeated, the user reaches the menu screen containing the FAX transfer menu. However, if a printing disabled error is not occurring (NO at S5), the FAX transfer processing (S9) described later need not be executed and thus the menu screen is not displayed. In the embodiment, if the user attempts to directly select the FAX transfer menu by pressing the numeric keys 7*a* like "9"→"0"→"1," the FAX transfer menu is not displayed and cannot be selected either. Therefore if a printing disabled error is not occurring, execution of the FAX transfer processing (S9) is suppressed.

Next, in the FAX transfer processing (S9), whether or not FAX reception data as substitute reception data exists is determined (S11), as shown in FIG. 6. That is, whether or not FAX reception data is stored in the substitute reception data storage area 835 of the RAM 83 (FIG. 4) is determined by referencing a substitute reception data flag (not shown) indicating that the FAX reception data as substitute reception data is not yet output to record paper and is saved in the substitute reception data storage area 835. If FAX reception data as substitute reception data does not exist (NO at S11), a menu screen indicating a message to the effect that image data to be FAX-transferred does not exist is displayed on the liquid crystal panel 7*f* (S12). That is, a menu screen 10*b* (10*b*') containing an indication 11*b* (11*b*') "No Data" indicating that FAX reception data as substitute reception data does not exist is displayed as shown in FIGS. 7 and 8. Then, the process returns to the main routine in FIG. 5.

If FAX reception data as substitute reception data exists (YES at S11), transmitter information (Station ID) is already registered is determined (S13). That is, in the embodiment, the FAX reception data can be transferred to a different terminal only if the user has previously registered transmitter information, such as the user's telephone number and name.

The transmitter information (Station ID) is registered for the following purpose: The user who purchased the multifunction processing machine 1 selects a menu item for registering transmitter information and registers the user's telephone number and name (company name, etc.) to be stored in the EEPROM 86 in the initial setup operation before using the multifunction processing machine 1. In that case, when FAX transmission is executed from the multifunction processing machine 1 to a different facsimile machine, the transmitter information converted into image data is added to the image data (original data) read through the image reader 5 for FAX transmission. Accordingly, the receiving party at the different facsimile machine receiving the image data (original data) can identify the transmitter from the transmitter information printed on record paper together with the original data.

Therefore, if such transmitter information is not registered, FAX transmission with no transmitter information is performed and thus the receiving party cannot identify the transmitter and may have the trouble determining how the received original is to be handled.

Particularly, if FAX transfer is executed, transmission is executed to a facsimile machine different from the initial destination and thus the possibility that such a situation may occur is high. Then, for the purpose of preventing such a situation from occurring, in the embodiment, FAX transfer is enabled only when the transmitter information is registered.

As shown in FIG. 9, the EEPROM 86 is provided with an area for registering (storing) the transmitter information. That is, the EEPROM 86 is provided with a transmitter telephone number storage area 131 for registering (storing) the telephone number of the telephone line to which the multifunction processing machine 1 is connected and a user name storage area 132 for registering (storing) the user's name (company name, etc.). The terminal of the multifunction processing machine 1 is identified according to the telephone number, etc., stored in the storage areas. It is a common practice for the user to enter the telephone number, etc., through the operation panel 7 as the initial setup operation upon purchasing a new multifunction processing machine 1.

If the transmitter information is not registered (NO at S13), a menu screen indicating a message to the effect that the transmitter information is not registered is displayed on the liquid crystal panel 7f (S14). That is, a menu screen 10c (10c') containing an indication 11c (11c') "No Station ID" indicating that the transmitter information is not registered is displayed as shown in FIGS. 7 and 8. Then, the process returns to the main routine in FIG. 5.

If the transmitter information is registered (YES at S13), the user enters or sets the telephone number of the transfer destination terminal (S15). That is, if the liquid crystal panel 7f is of one-line type, a menu screen 10d containing a menu item 11d "Enter Fax No." for entering the telephone number of the transfer destination terminal is displayed on the liquid crystal panel 7f and the user enters any desired transfer destination telephone number from the menu item 11d through the operation panel 7, as shown in FIG. 7.

Then, a menu screen 10e containing a menu item 11e "Press Start" for entering a transfer execution command of FAX reception data is displayed on the liquid crystal panel 7f and the user presses the Black Fax Start button 7d or the Color Fax Start button 7e as described later for executing transfer of the FAX reception data. If the liquid crystal panel 7f is of two-line type, a menu screen 10d' containing menu items 11d' and 11e' is displayed; the processing is the same as that on the one-line type display.

If the user presses the Black Fax Start button 7d (YES at S16), the transfer destination terminal is called based on the telephone number entered at S15 and the FAX reception data is transmitted to the transfer destination terminal in the monochrome mode (S17). If the user does not press the Black Fax Start button 7d (NO at S16) and presses the Color Fax Start button 7e (YES at S18), the FAX reception data is transmitted to the transfer destination terminal in the color mode (S19). If the user does not press the Color Fax Start button 7e (NO at S18), a wait state is entered at S16.

Image data into which the transmitter information registered (stored) in the EEPROM 86, namely, the transmitter telephone number and name are converted is added to the top of the FAX reception data transferred at S17 or S19 (upper end of page) for transmission to the transfer destination terminal. Therefore, at the transfer destination terminal, the transmitter information is printed at the upper end of the printout record paper, so that the user receiving the information can identify the transmitter of the received FAX reception data.

The FAX reception data transferred at S17 or S19 is received at the transfer destination terminal and is recorded in a predetermined storage area such as a reception buffer (not shown) When printing based on the FAX reception data is executed at the transfer destination terminal, the FAX reception data transferred in the monochrome mode is printed in monochrome; the FAX reception data transferred in the color mode is printed in color. After S17 or S19, the transferred FAX reception data is deleted from the substitute reception data storage area 835 of the multifunction processing machine 1 (FIG. 4).

If "No Station ID" is displayed at S14 in FIG. 6, the user may select the item of a transmitter information registration menu and register transmitter information by operating the keys such as the Menu/Set button 7c. Then, if the user again operates the keys for FAX transfer in a similar manner to described above, FAX transfer can be executed without any problems.

As described above, according to the multifunction processing machine 1 according to the embodiment, when a printing disabled error is not occurring, the FAX transfer menu is not displayed and cannot be selected either, so that the menu screen display and composition can be simplified, enabling the user to find out other menu items easily and promptly. The user can also be prevented from selecting the FAX transfer menu by mistake.

On the other hand, when a printing disabled error is occurring, it is made possible to selectably display the FAX transfer menu as the menu item capable of handling a printing error and the FAX transfer menu can be selected. Accordingly, when a printing disabled error is occurring, the user can reliably select the FAX transfer menu and handle the printing disabled error. It is made possible to selectably display the FAX transfer menu as the necessary menu item on the menu screen only when a predetermined type of machine error such as a printing disabled error is occurring, so that the menu screen composition can be simplified, enabling the user to set or specify the necessary menu item easily and promptly.

Since the FAX reception data can be transmitted to the transfer destination terminal only if transmitter information is registered, the receiving party can be prevented from having trouble determining how the received data is to be handled because the transmitter cannot be identified. Further, the user can select monochrome mode transfer or color mode transfer, so that, for example, if the FAX reception data is color, data transfer can be executed in the monochrome mode. Accordingly, it is made possible to decrease the load on the facsimile machine of the receiving party. If the facsimile machine of the receiving party is monochrome mode only, even if an attempt is made to execute color mode transfer, monochrome mode transfer is applied, needless to say.

In the embodiment, the liquid crystal panel 7f functions as "a display" of the invention, the operation panel 7 functions as "an operation unit" of the invention, and the CPU 81 for executing the menu screen display processing (FIG. 5) functions as "a display control unit" of the invention. The NCU 92 and the modem 93 function as "a communication control unit" of the invention, the substitute reception data storage area 835 provided in the RAM 83 functions as "a storage unit" of the invention, and the image formation apparatus 3 functions as "a record unit" of the invention. The FAX transfer menu functions as "a facsimile transfer operation" of the invention, the telephone number, etc., stored in the transmitter telephone number storage area 131 functions as "transmitter information" of the invention, and the EEPROM 86 functions as "a transmitter information storage unit" of the invention.

As described above, the embodiment of the invention provides the multifunction processing machine 1 in which display/undisplay of the menu item (the FAX transfer menu) is determined based on the predetermined operational status, such as the occurrence of a printing disabled error, while the user is making transition of the menu screen by operating the operation panel, so that the user can effectively cope with the predetermined operation status by selecting and operating the menu item. Accordingly, the user can easily and quickly find the menu item corresponding to the effective operation when the machine is in the predetermined operational status, while simplifying the menu items in the layers of menu displayed when the machine is in a normal condition.

The invention is not limited to the specific embodiment described above in detail and various modifications of the invention can be made, needless to say.

In the invention, it is made possible to display a menu screen for the operation mode required only when a predetermined type of machine error occurs. In the embodiment described above, a printing disabled error has been illustrated as "predetermined type of machine error" and the FAX transfer menu has been illustrated as the "operation mode" required for the printing disabled error. However, various types of the correspondence between the "predetermined type of machine error" and the "operation mode" can be applied.

For example, only when an ink-out condition is occurring in the image formation apparatus 3, it may be made possible to display an ink replacement menu for replacing an ink cartridge on the menu screen and the user may be enabled to select the ink replacement menu only during occurrence of the ink-out condition. Further, when the ink-out condition is occurring in the image formation apparatus 3, the FAX transmission menu may be displayed together with the ink replacement menu while the user is making transition of the menu screen by operating the operation panel 7. Then, it is possible to provide a function of the FAX transmission as a substitute for a function incapable due to the ink-out condition. Only when a paper jam is occurring in the automatic paper feeder 33, it may be made possible to display an original ejection menu for the user to enter a command of forcible original ejection operation on the menu screen. Accordingly, the user may be enabled to select the original ejection menu only during occurrence of the paper jam. Thus, various types of the correspondence between the "predetermined type of machine error" and the "operation mode" are possible and the user or the designer can preset the correspondence therebetween as desired; the invention can be applied regardless of what type of correspondence between the "predetermined type of machine error" and the "operation mode" is.

The "predetermined type of machine error" is not limited to a printing disabled error and can be applied if it indicates any particular machine status including an operational status, or an error status, in the multifunction processing machine 1 regardless of a hardware or software error. For example, it can also be applied to a machine error status of the multifunction processing machine 1 such that the cover section 30 (FIG. 1) is open or that the image reader 5 fails.

The "operation mode" is not limited to the FAX transfer menu and can be applied if it indicates the operation, control, etc., in the multifunction processing machine 1 regardless of hardware or software. For example, when a printing disabled error is occurring, it may be made possible to display a FAX save menu for saving FAX reception data in external storage via the parallel interface 90 or the USB interface 91, or a FAX reception refusal menu for refusing reception of FAX reception data, or the like.

The menu screen display processing shown in FIG. 5 has been described by taking the case where the invention is applied to the menu system having the hierarchical structure of menu screen display as an example, but the invention can be applied to other known menu systems if they allow the invention to be embodied where the operation mode required for a predetermined type of machine error is displayed only when such machine error is occurring.

The facsimile machine of the invention can be applied not only as a single unit of a facsimile machine, but also to various machines including a facsimile function, such as a multifunction processing machine and a multifunctional apparatus.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

What is claimed is:

1. A facsimile machine, comprising:
   a communication control unit configured to transmit and receive image data via a line;
   a storage unit configured to store the image data received by the communication control unit;
   a recording unit configured to record an image corresponding to the image data stored in the storage unit on a recording sheet;
   a display configured to display a menu screen including a menu item;
   a command reception unit configured to receive a command inputted by a user based on the menu screen;
   a display control unit configured to determine whether the facsimile machine has a machine error occurring therein or not in response to a first command received by the command reception unit to display a specific menu item indicating a facsimile transfer operation of the received image data to a different terminal if the facsimile machine has the machine error, and not to display the specific menu item if the facsimile machine does not have the machine error; and
   a menu item execution controller configured, on a condition that the facsimile machine has the machine error, to execute the facsimile transfer operation of the received image data, corresponding to the specific menu item in response to receiving a second command indicating that the specific menu item is selected by the user.

2. The facsimile machine as claimed in claim 1,
   wherein the machine error corresponds to a record error relating to execution of recording by the record unit.

3. The facsimile machine as claimed in claim 2,
   wherein, when the facsimile machine has the machine error, the display control unit selectably displays on the menu screen the specific menu item.

4. The facsimile machine as claimed in claim 1, further comprising:
   a transmitter information storage unit configured to store transmitter information to identify a transmitter of the image data received by the communication control unit;

wherein the facsimile transfer operation comprises transmitting the image data with the transmitter information to the different terminal when the transmitter information for the image data is stored in the transmitter information storage unit.

5. The facsimile machine as claimed in claim 1, further comprising:
a storage unit configured to store layers of menus including a plurality of menu items and information indicating a correspondence between the machine error and the specific menu item,
wherein the display control unit allows the specific menu item, which is included in the plurality of menu items on the menu screen only when the display control unit determines that the facsimile machine has the machine error, the menu screen corresponding to one of the layers of menus that includes the specific menu item.

6. The facsimile machine as claimed in claim 1,
wherein the specific menu item further indicates an operation to overcome the machine error.

7. The facsimile machine as claimed in claim 1,
wherein the operation unit includes numeric keypads; and
the display control unit is configured to allow the specific menu item to be displayed on the menu screen in response to an input of a numeral designating the specific menu item through the numeric keypads, only when the facsimile machine has the machine error.

8. The facsimile machine as claimed in claim 1,
wherein the operation unit includes a cursor key; and
the display control unit is configured to change the menu screen to be displayed in response to a press of the cursor key such that the specific menu item is displayed, only when the facsimile machine has the machine error.

9. The facsimile machine as claimed in claim 1,
wherein the specific menu item includes a first start button and a second start button, and
wherein the menu item execution controller executes the facsimile transfer operation of the received image data in a monochrome mode if the first start button is selected by the user, and the menu item execution controller executes the facsimile transfer operation of the received image data in a color mode if the second start button is selected by the user.

10. The facsimile machine as claimed in claim 1,
wherein when the second command is received by the command reception unit, the display control unit displays a screen for entering a destination of the facsimile transfer operation.

* * * * *

UNITED STATES PATENT AND TRADEMARK OFFICE
CERTIFICATE OF CORRECTION

PATENT NO.      : 7,656,560 B2
APPLICATION NO. : 11/094138
DATED           : February 2, 2010
INVENTOR(S)     : Daisuke Kasamatsu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1282 days.

Signed and Sealed this

Thirtieth Day of November, 2010

David J. Kappos
*Director of the United States Patent and Trademark Office*